Nov. 22, 1949 R. D. PIKE 2,488,604
PROCESS FOR RECOVERY OF ELEMENTAL PHOSPHORUS
AND COMPOUNDS OF POTASSIUM
Filed July 16, 1945 2 Sheets—Sheet 1

INVENTOR.
Robert D. Pike
BY
ATTORNEYS

Nov. 22, 1949 R. D. PIKE 2,488,604
PROCESS FOR RECOVERY OF ELEMENTAL PHOSPHORUS
AND COMPOUNDS OF POTASSIUM
Filed July 16, 1945 2 Sheets-Sheet 2

Fig. 2.

INVENTOR.
BY Robert D. Pike
Hammond H. Littell
ATTORNEYS

Patented Nov. 22, 1949

2,488,604

UNITED STATES PATENT OFFICE 2,488,604

PROCESS FOR RECOVERY OF ELEMENTAL PHOSPHORUS AND COMPOUNDS OF POTASSIUM

Robert D. Pike, Pittsburgh, Pa.

Application July 16, 1945, Serial No. 605,421

10 Claims. (Cl. 23—28)

This invention relates to the recovery of elemental phosphorus together with certain alkali compounds from phosphate rock and more particularly to the recovery of said materials from an admixture of phosphate rock and Wyomingite.

I have previously disclosed a process for treating an admixture of phosphate rock and Wyomingite or other equivalent potassium silicate mineral in a coke-fired blast or other equivalent form of furnace, preferably using an oxygen enriched blast, in such a manner as to recover substantially all of the potash and phosphorus present as a mixture of phosphoric acid and monopotassium phosphate, wherein the ratio of $K_2O$ to $P_2O_5$ is from 0.2 to 0.3 by weight. Now I have discovered that elemental phosphorus and other valuable alkali ingredients can be recovered separately from a coke-fired blast or equivalent reduction furnace containing an admixture of phosphate rock and Wyomingite. In this improved process I have found that the elemental phosphorus can be recovered in a more highly purified form by de-fluorinating the phosphate rock before it is introduced into the blast furnace. It is especially important to de-fluorinate western phosphate rock, such as that found in southeastern Idaho in close proximity of the Wyomingite deposits of southwestern Wyoming, which is high in fluorine content, for otherwise the recovered elemental phosphorus is likely to be contaminated with fluorine compounds, particularly potassium fluosilicate.

In a special embodiment of my invention, phosphate rock is mixed with Wyomingite in an amount sufficient to facilitate the removal of the fluorine content of the phosphate rock but in an amount insufficient to form a melt or flux at de-fluorinating temperatures. This mix is then heated at a temperature sufficiently high to drive off the fluorine content or a major portion thereof. Enough Wyomingite is added to the resulting de-fluorinated mix to make a free-flowing slag, sufficient coke is added to furnish the heat necessary to form the slag and maintain reducing conditions in the hearth and bosh, and the composite charged into a blast furnace. This charge is subjected to an air blast which is preheated and preferably oxygenated. The vaporized phosphorus is collected by condensation with water and the remaining fume-containing gases, which fumes I have found are not wetted by water, including valuable alkali compounds, are collected separately. While the foregoing description is particularly applicable to western phosphate rock, it will be true to a greater or lesser extent of any phosphate rock when treated in a blast furnace with a potash-bearing flux.

More particularly, in the defluorinating step phosphate rock is ground and mixed with ground Wyomingite and enough water and binding agent such as lignin liquor, if necessary, added to form a mixture composed of small agglomerations. Such agglomeration may be formed in a nodulizer. Normally the Wyomingite is introduced in a minor percentage, usually not exceeding 30 per cent of the weight of the entire mix, say about 10 to 40 per cent of the phosphate rock, for higher percentages of Wyomingite may produce a melt at de-fluorinating temperatures. After the phosphate rock and Wyomingite are formed into nodules, these nodules are introduced into a suitable heating device, advantageously a rotary kiln, and subjected therein to heating at temperatures sufficient to volatilize the fluorine but insufficient to form a melt. Temperatures of about 2550 to 2750° F. customarily are sufficient to drive off the fluorine and form a clinker substantially free of fluorine. This clinker is mixed with sufficient additional Wyomingite to form a free-flowing slag under the temperature conditions used in recovering the phosphorus from the mixture used in the next step in the process. In the de-fluorination step, I have observed that the fluorine content of the phosphate rock is driven off as alkali fluorides mainly potassium fluorides, and a minor percentage of sodium fluorides, and any excess as hydrofluoric acid. I have observed further that the fluorine content of the phosphate rock converted to potassium fluoride is more easily driven off than either the sodium fluoride or the hydrofluoric acid. The potassium fluoride driven off in the de-fluorination of the phosphate rock may be precipitated out and reacted with sulfuric acid to give a potassium sulfate of high purity.

In a preferred practice enough potassium sulfate produced in this or a later phase of my process is introduced into the nodulizer to complement the potassium content of the phosphate rock and Wyomingite mixture to the extent necessary to bind all or substantially all of the fluorine. The alternative to recirculating of the potassium sulfate is to continue the heating for a longer period of time at the preferred de-fluorinating temperatures or at higher temperatures for a lesser period of time, both of which add to the cost of the process. Since the potassium sulfate is a byproduct in my phosphorus recovery and de-fluorinating process and also facilitates the liberation of fluorine and in view of the further fact that the potassium content of the potassium sulfate is again recovered after recirculation, this feature of my invention is of great practical importance. The recirculation of the potassium sulfate, where needed, has the additional advantage of eliminating the highly toxic hydrofluoric acid from the kiln gases.

The coke used in the furnace which is employed in the phosphorus recovery phase of my process always contains sulfur which is burned therein and combines with the alkali fume in the top gases to form sulfites with some of the volatilized materials. Usually the amount of sulfur in the coke is inadequate, however, to combine with all of the volatilized alkali present, and the remaining portions form carbonates with the carbon dioxide. This mixture of alkali sulfites and carbonates driven off as a fume or fog may be recovered, for instance, in a wet electrostatic precipitator as a solution of the highly soluble sulfites and carbonates. The carbonates and sulfites are easily converted with $SO_2$ gas and oxygen, advantageously in the presence of a catalyst, to sulfates. The sulfates can then be collected as dry high purity materials which are easily packaged and are stable in storage.

It is also desirable that both the burden to the furnace and the gases containing the elemental phosphorus and the alkali fume be as free as possible of dust which tends to contaminate the phosphorus when present. The latter objective may be achieved by passing the volatilized phosphorus and the fume-containing gases through an appropriate dust collector.

Wyomingite is a potassium silicate mineral deposit found in southwestern Wyoming and typically has about the following composition:

| | |
|---|---|
| $K_2O$ | 11.57 |
| $Na_2O$ | .75 |
| $SiO_2$ | 51.40 |
| $Al_2O_3$ | 13.80 |
| $FeO$ | 1.60 |
| $Fe_2O_3$ | 4.10 |
| $CaO$ | 5.60 |
| $MgO$ | 7.58 |
| $P_2O_5$ | 2.20 |
| $SO_3$ | .43 |
| $CO_2$ | .20 |
| $H_2O$ | 1.00 |
| | 100.23 |

It will be understood, however, that other analogous siliceous fluxing agents containing potash may be used in my process.

A typical western phosphate rock has the following analysis:

| | |
|---|---|
| $P_2O_5$ | 33.00 |
| $CaO$ | 50.24 |
| $MgO$ | .54 |
| $SO_3$ | 3.12 |
| $F$ | 3.51 |
| $Fe_2O_3$ | .70 |
| $Al_2O_3$ | 1.14 |
| $SiO_2$ | 3.85 |
| $Na_2O$ | .55 |
| $K_2O$ | .23 |
| Ash | 96.7 |

My invention will be understood readily when described in connection with a diagrammatic representation of apparatus used in my process.

Figure 2 shows apparatus used in recovering phosphorus from the phosphatic materials obtained in the first phase of my process or from other desirable sources.

Figure 1:
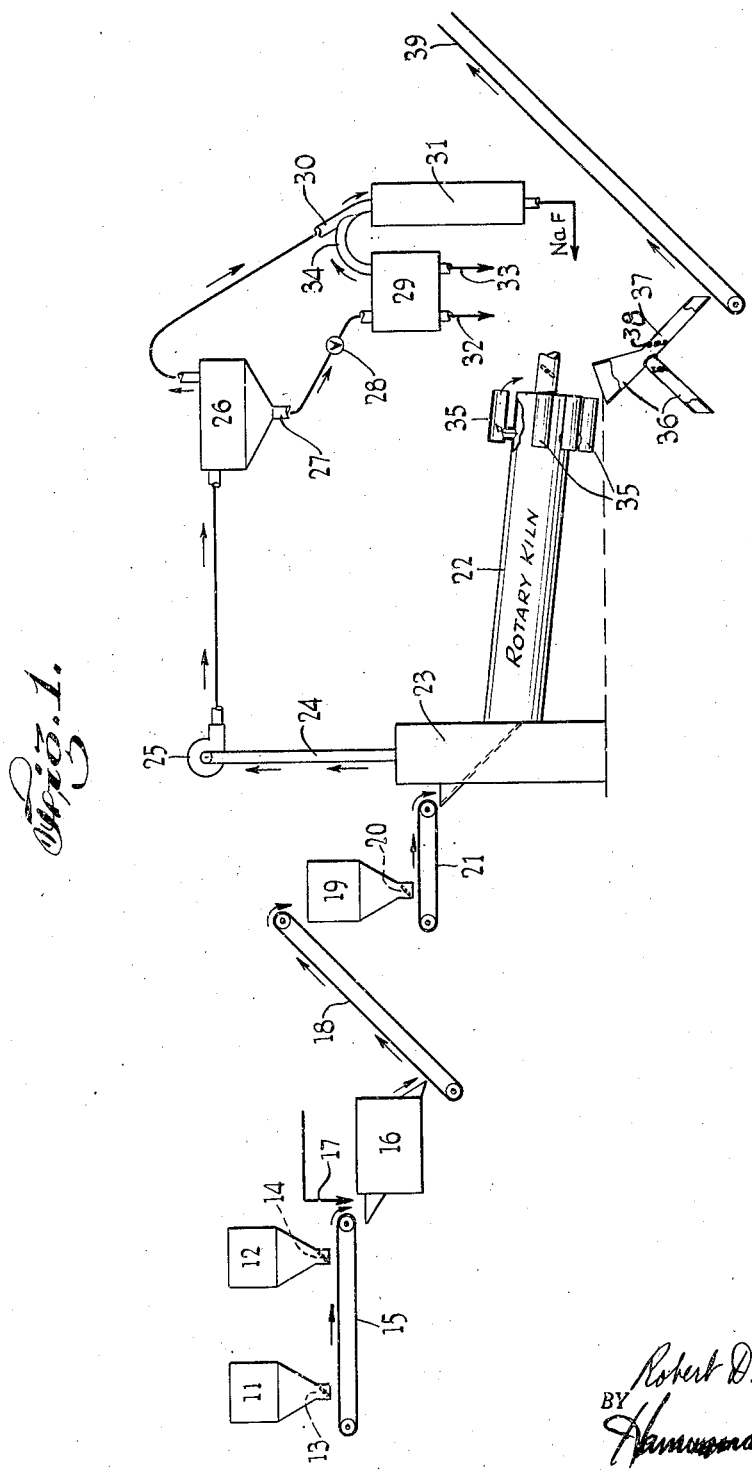
Figure 1 shows apparatus used in the de-fluorinating phase of my process.

I now refer to Figure 1. Ground phosphate rock from bin 11 and Wyomingite from bin 12 is introduced respectively through gates 13 and 14 onto a conveyor belt 15 and thereby transferred into a nodulizer 16 where the admixture of phosphate rock and Wyomingite with added water and binding agent, if necessary, are formed into nodules. Potassium sulfate may be introduced into the nodulizer through conduit 17 in order to supplement the potassium content of the Wyomingite to a degree sufficient to combine with substantially all of the fluorine present.

The formed nodules are carried by conveyor 18 into a surge bin 19. From this surge bin 19, the nodules pass through control gate 20, are carried onto conveyor 21 and into the rotary kiln 22. The nodules are heated in this rotary kiln at temperatures ranging from about 2550° to 2750° F. until substantially all of the fluorine is driven off as potassium fluoride.

The gases given off from this rotary kiln are collected in stack 23 and are evacuated therefrom through conduit 24 by blower 25 to an electrostatic precipitator 26. The fume contained in the kiln gases such as the potassium fluoride and the minor proportion of sodium fluoride are precipitated out in precipitator 26 and passed through conduit 27 controlled by valve 28 into a reaction chamber 29. The remaining stack gases including any hydrogen fluoride are drawn off through conduit 30 and led into a solution of sodium carbonate in reaction tower 31 where the hydrogen fluoride is converted into sodium fluoride.

The potassium fluoride and the small percentage of sodium fluoride are reacted with sulfuric acid in reaction chamber 29 and converted therein to potassium sulfate and sodium sulfate. The net amount of potash and soda introduced with the raw material is substantially all recovered as sulfate and may be removed and sold as a valuable by-product, for the amount recirculated to nodulizer 16, as described above, is also recovered. I have observed that the percentage of sodium sulfate is very small, and the potassium sulfate is therefore of a higher purity than that normally found in commercial processes. A part of the potassium sulfate is led through conduit 32 for use in the nodulizer. Any excess potassium sulfate is led through conduit 33 to an appropriate collection tank and thereafter used for any purpose requiring a high purity product.

The hydrogen fluoride formed in reaction chamber 29 is led through conduit 34 into conduit 30 leading to chamber 31 where it is also recovered as sodium fluoride.

The fired and clinkered nodules formed in rotary kiln 22 are led into the cooling units 35 and from there into a valve-controlled branched conduit 36 leading to a stock pile where they may be stored in the open due to their water insolubility. This de-fluorinated phosphate rock may be used as a fertilizer or as an animal feed.

In the alternative the de-fluorinated phosphate rock may be led through conduit 37 controlled by valve 38 to a conveyor belt 39 which carries the nodules to a bin and thence to the furnace used in the next phase of my process.

In the next or phosphorus recovery phase of my process (Figure 2), phosphate rock, preferably de-fluorinated as previously described, in bin 40 is led through control gate 41 and conduit 42 into a blast furnace 43. Simultaneously, enough Wyomingite from bin 44 is led through control gate 45, conduit 46, and conduit 42 into furnace 43 to make a free-flowing slag with the phosphate rock at temperatures which will vaporize off the phosphorus content of the phosphate rock. At the same time coke, in the quantity necessary to furnish the heat for the free-flowing slag and to maintain reducing conditions in the hearth and bosh of the furnace, is introduced into the furnace 43 from bin 47 by being led through gate 48, conduit 49, and conduit 42.

The furnace 43 is blasted with air at about 1200° F. from blast stoves 50, which are preferably fired by surplus furnace top gases. As the heated air passes from the blast stoves 50 to the furnace 43 through the conduit 51, it is preferably enriched with $O_2$, entering conduit 51 through the valve-controlled conduit 52, until the oxygen content of the hot gases is approximately 30 per cent by weight. Slag is flushed periodically from the hearth of the furnace 43 through valve 53 and a conduit 54, usually at intervals of two to four hours.

The furnace top gases pass into a conduit 55 and through a dust catcher 56 into scrubbing tower 57 and thence through conduit 58 into a second scrubbing tower 59. The towers 57 and 59 preferably have acid-proof lining and are filled with carbon packing.

The elemental phosphorus is collected in the scrubbing towers and passes therefrom through suitable conduits 60 and 61 into a conduit 62 leading to a thickener 63. The underflow of the thickener 63 passes through conduit 64 into a phosphorus storage tank 65, where the elemental phosphorus is kept under water.

The overflow of thickener 63 passes through conduit 66 into a surge tank 67 for recirculation. The overflow is recirculated by means of a pump 68 in conduit 69 and thence through conduits 70 and 71 into the tops of the scrubbing towers 57 and 59. If necessary, the recirculated water is bled through a bleeder 72 on the way from the surge tank and the scrubbing towers to control the concentration of phosphoric acid and potash, some of which are inevitably accumulated by the water.

When additional water is needed in the circulatory system, it is supplied from tank 73 which is provided with water from an outside source through valve-controlled conduit 74. The water passes from the tank 73 through conduit 75, valve 76, pump 77, conduit 78 and thence to the circulatory system.

The furnace top gases passing through scrubbing towers 57 and 59 are led through conduit 79 into a wet electrostatic precipitator 80. Some of the make-up water may be used for further scrubbing the furnace top gases by passing it through a conduit 81 into a combined pump and scrubber 82 in conduit 83. The water from the combined pump and scrubber is collected in tank 84 and returned to the circulatory system through conduits 85 and 86. The scrubbed gases pass through conduit 87 into conduit 79 and thence into the wet electrostatic precipitator 80.

The alkali sulfites and carbonates mostly of potassium are precipitated by the electrostatic precipitator 80 in the form of a strong solution and withdrawn through a conduit 88. This solution of sulfites and carbonates is readily converted into the corresponding sulfates, by treating it with atmospheric air and $SO_2$, which are then recovered as high purity materials by evaporation.

The surplus top gases pass through conduit 89 back to the blast stoves 50, where they are used for heating the air for blasting the furnace.

I have observed that the alkali compounds in the fumes are very difficult to wet with water and that substantially all of them will pass through the scrubbers 57 and 59.

In order to recover a ton of elemental phosphorus, I have found that I must charge my furnace with a burden consisting of the following ingredients in the approximate tonnages shown:

| | Tons |
|---|---|
| Phosphate rock | 8.95 |
| Wyomingite flux | 7.17 |
| Coke | 6.68 |

In such a burden about 82 per cent of the potash ($K_2O$) content will be volatilized and recovered, and about 68 per cent of the soda ($Na_2O$) will be recovered. This gives the following amount of $K_2O$ and $Na_2O$ per ton of phosphorus recovered, of which about 87 per cent of that present in the phosphate rock is collected.

| | Tons |
|---|---|
| $K_2O$ | .68 |
| $Na_2O$ | .037 |

In a typical charge adequate for recovering a ton of phosphorus, there is usually present in the coke about .067 ton of sulfur, which burns and which forms sulfites with the alkalies in the furnace gases when the latter are collected as fumes. The .067 ton of sulfur corresponds to .329 ton of potassium sulfate, which, in turn, corresponds to .197 ton of $K_2O$. Thus in round numbers there is sufficient sulfur ordinarily present in the coke to convert about 29 per cent of the potash to sulfite, leaving the remaining potassium to form a carbonate. For example, in a plant making 20 tons of elemental phosphorus daily, there would be about the following amounts of alkali compounds collected in the electrostatic precipitator.

| | Tons |
|---|---|
| Potassium carbonate | 14.2 |
| Potassium sulfite | 6.6 |
| Sodium carbonate | 1.3 |

These yields are based upon the assumption that all of the original $K_2O$ in the Wyomingite is recovered, but we have shown above that this will be reduced by the amount of Wyomingite used in the preliminary step of de-fluorination. However, as all of the $K_2O$ from the Wyomingite used in the de-fluorination step is also recovered as sulfate, no real error is to be attributed to this assumption.

I may pass the solution of alkali sulfites and carbonates, mostly of potassium to a treating step not shown, which will comprise a gas treating tower into which I pass $SO_2$ gas and air in sufficient quantity to convert all of the alkali sulfites and carbonates present to sulfates. This reaction of oxidation may be facilitated if desired by the presence of a suitable catalyst. Potassium sulfate of high purity may be recovered from the oxidized solution.

The total production from a plant using both steps of my process illustrated in Figures 1 and 2 and making twenty tons elemental phosphorus daily would be about:

| | Tons |
|---|---|
| Potassium sulfate | 25 |
| Sodium sulfate | 1.75 |

Thus the value of the daily production of alkali byproducts is an important item in my process in reducing the cost of operations.

It will be understood that the embodiments of my invention described and illustrated herein are only representative of the principles of my invention and the agents used therein. Various modifications in the illustrative embodiments of my invention can be made without departing from the spirit of the invention or its scope which is defined in the appended claims.

I claim:

1. A process for the recovery of phosphorus and compounds of potassium and sodium from phosphate rock and Wyomingite which comprises charging a coke-fired blast furnace with phosphate rock and sufficient Wyomingite to make a free-flowing slag together with a sufficient amount of sulfur-bearing coke to furnish heat and reducing conditions in the hearth and the bosh of the furnace, firing the furnace to volatilize the phosphorus and the compounds of sodium and potassium, passing the volatilized materials through water and condensing the phosphorus substantially free of alkali therein, and electrostatically precipitating the unwetted potassium and sodium compounds from the gases passing through the water.

2. A process for recovering phosphorus and other valuable products from phosphate rock comprising removing fluorine from said rock by forming a mix containing phosphate rock and potassium-bearing silicate which will clinker at defluorinating temperatures, heating the mix to form clinker and drive off fluorine, charging into a furnace said clinker and enough additional potash-bearing silicate to make a free-flowing slag together with enough coke to furnish reducing conditions in the furnace, heating said furnace to form said free-flowing slag and drive off phosphorus and other valuable ingredients including a compound of potassium, and collecting said other valuable ingredients separately from said phosphorus.

3. A process for recovering elemental phosphorus and other valuable alkali ingredients from phosphate rock high in fluorine content which comprises forming an agglomerate containing phosphate rock and potash-bearing silicate in proportions which will form a clinker at defluorinating temperatures together with enough potassium compounds to complement the potassium content of the phosphate rock and potash-bearing silicate to combine with substantially all of the fluorine content of the mix, heating said agglomerate to form a clinker and drive off a substantial portion of the fluorine content thereof, charging said clinker with enough additional potash-bearing silicate to make a free-flowing slag together with enough coke to furnish reducing conditions in a furnace, firing said furnace to form said free-flowing slag and to drive off elemental phosphorus and valuable alkali compounds including a compound of potassium, collecting phosphorus, and collecting said valuable alkali compounds.

4. A process for volatilizing phosphorus and alkali compounds from phosphate rock and potash-bearing silicate which comprises charging into a furnace phosphate rock with sufficient potash-bearing silicate to make a free-flowing slag together with the necessary amount of coke for furnishing reducing conditions in the furnace, heating the furnace to form slag and volatilize the phosphorus and alkali compounds, passing said volatilized materials through water and condensing phosphorus substantially free of alkali therein, and collecting the unwetted alkali compounds including a compound of potassium from the gases after they have passed through the water by electrostatic precipitation.

5. A process for extracting phosphorus and alkali compounds from alkali-bearing and phosphorus-bearing rocks which comprises volatilizing the phosphorus and alkalies by smelting under reducing conditions in a furnace with coke containing sulfur, collecting volatilized phosphorus substantially free of alkali from the gases produced by the smelting operation by condensation with water, and separately collecting the unwetted alkalies present in said gases including a compound of potassium, at least in part as sulfites.

6. A process for extracting phosphorus and alkali compounds from potash-bearing and phosphorus-bearing rocks which comprises volatilizing the phosphorus and alkali compounds by smelting under reducing conditions in a furnace with coke containing sulfur, passing the volatilized phosphorus and alkali compounds through water, collecting phosphorus substantially free of alkali therein, and collecting unwetted alkali compounds including a compound of potassium from the gases passing through the water in a water solution in a separate collector by electrostatic precipitation.

7. The process for volatilization of phosphorus and compounds of potassium from phosphate rock and potash-bearing silicate which comprises charging into a furnace phosphate rock with sufficient of the said silicate to make a free-flowing slag together with the necessary amount of coke for furnishing a reducing condition in the furnace, collecting phosphorus driven off in the furnace gases by condensation with water, and collecting the potash also present in the furnace gases separately as a solution of sulfites and carbonates of potassium, and oxidizing said solution in the presence of $SO_2$ to convert substantially all of the potassium compounds present to potassium sulfate.

8. A process for the recovery of elemental phosphorus and compounds of potassium from phosphate rock and potash-bearing silicate which comprises charging a furnace with phosphate rock and sufficient of the said silicate to make a free-flowing slag together with a sufficient amount of sulfur-bearing coke to furnish reducing conditions in the furnace, heating the furnace to volatilize phosphorus and a compound of potassium, passing the volatilized material through water and condensing phosphorus substantially free of alkali therein, and electrostatically precipitating an unwetted compound of potassium from the gases after passing through the water.

9. A process for extracting elemental phosphorus and alkali compounds from Wyomingite and phosphate rock which comprises charging a furnace with said Wyomingite and phosphate rock, volatilizing phosphorus and alkali compounds including a compound of potassium by smelting the charge under reducing conditions, collecting phosphorus substantially free of alkali from the gases produced from the smelting operation by passing the phosphorus in contact with water, and separately collecting unwetted alkali compounds including a compound of potassium.

10. A process for extracting elemental phosphorus and alkali compounds from rocks bearing a substantial amount of potash and rocks bearing a substantial amount of phosphorus comprising charging a furnace with said rocks and volatilizing phosphorus and alkali compounds including a substantial amount of a compound of potassium by smelting the rocks under reducing conditions, collecting phosphorus substantially free of alkali from the gases produced from the smelting operation by contacting the phosphorus with water, and separately collecting unwetted alkali compounds including a compound of potassium.

ROBERT D. PIKE.

REFERENCES CITED

The following references are of record in the file of this patent:

UNITED STATES PATENTS

| Number | Name | Date |
|---|---|---|
| 1,692,787 | Pistor et al. | Nov. 20, 1928 |
| 1,701,286 | Waggaman et al. | Feb. 5, 1929 |
| 1,815,379 | Pike | July 21, 1931 |

FOREIGN PATENTS

| Number | Country | Date |
|---|---|---|
| 347,937 | Great Britain | May 7, 1931 |

OTHER REFERENCES

Haslam et al., Fuels and Their Combustion, First ed., page 705. Pub. by McGraw-Hill, New York (1926).